United States Patent [19]

Puydak et al.

[11] Patent Number: 5,100,947
[45] Date of Patent: Mar. 31, 1992

[54] DYNAMICALLY VULCANIZED ALLOYS HAVING IMPROVED STIFFNESS/IMPACT BALANCE

[75] Inventors: Robert C. Puydak, Cranbury; Donald R. Hazelton, Chatham, both of N.J.; Blair A. Graham, Bright's Grove, Canada; Narayanaswami R. Dharmarajan, Highland Park, N.J.

[73] Assignee: Advanced Elastomer Systems, L. P., St. Louis, Mo.

[21] Appl. No.: 495,839

[22] Filed: Mar. 19, 1990

Related U.S. Application Data

[63] Continuation-in-part of Ser. No. 358,974, May 26, 1989, abandoned.

[51] Int. Cl.$^5$ .............................. C08K 3/10; C08K 3/20; C08K 3/36
[52] U.S. Cl. .................................... 524/423; 524/445; 524/451; 524/425; 524/525; 524/528; 524/504; 525/74; 525/192; 525/194; 525/197
[58] Field of Search .................. 524/528, 525, 423; 525/192, 194, 197, 211, 232

[56] References Cited

U.S. PATENT DOCUMENTS

| | | | |
|---|---|---|---|
| Re. 31,518 | 2/1984 | Fischer | 525/194 |
| 4,130,535 | 12/1978 | Coran et al. | 260/33.6 |
| 3,037,954 | 6/1962 | Gessler et al. | 260/29.8 |
| 4,202,801 | 5/1980 | Petersen | 260/5 |
| 4,212,787 | 7/1980 | Matsuda | 260/33.6 |
| 4,311,628 | 1/1982 | Abdou-Sabet et al. | 260/33.6 |
| 4,433,073 | 2/1984 | Sano et al. | 523/201 |
| 4,593,062 | 6/1986 | Puydak et al. | 524/426 |
| 4,735,982 | 4/1988 | Orndorff, Jr. | 524/269 |
| 4,912,148 | 3/1990 | Kim et al. | 524/487 |
| 4,957,968 | 9/1990 | Adur et al. | 525/194 |

*Primary Examiner*—Carman J. Seccuro
*Attorney, Agent, or Firm*—Gordon B. Seward

[57] ABSTRACT

A dynamically vulcanized composition comprising a polyolefin resin and an elastomer is provided in which a major portion of fillers or specified additives are present in the polyolefin resin. A process for producing the dynamically vulcanized composition is also provided including the addition of the fillers and/or specified additives after the dynamic vulcanization step. The compositions have improved stiffness to impact balance.

15 Claims, No Drawings

5,100,947

DYNAMICALLY VULCANIZED ALLOYS HAVING IMPROVED STIFFNESS/IMPACT BALANCE

CROSS REFERENCE TO RELATED APPLICATIONS

This application is a continuation-in-part of U.S. patent application Ser. No. 358,974, filed May 26, 1989, now abandoned, the teachings of which are hereby incorporated by reference.

BACKGROUND OF THE INVENTION

1. Field of the Invention

This invention relates to dynamically vulcanized alloys ("DVAs") which generally comprise a polyolefin thermoplastic resin, an elastomeric component, and additives and fillers which have been added for improved chemical and physical properties.

2. Description of Information Disclosures

Polymer blends which have a combination of both elastic and thermoplastic properties are of significant commercial interest. Such thermoplastic elastomeric compositions are generally obtained by blending an elastomeric polymer with a thermoplastic resin in a way such that the elastomer is intimately and uniformly dispersed as a discrete or co-continuous phase within a continuous phase of the thermoplastic polymer. These polymer blends have been given the generic designation of Thermoplastic Olefins ("TPO"). They exhibit some of the properties of a cured elastomer as well as the reprocessability of a thermoplastic resin. The elastomeric characteristics are enhanced if one component of the blend is a vulcanizable elastomer which is wholly or partially cross-linked.

The earliest work in the curing of a TPO composition was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The resulting blend is a micro-gel dispersion of cured elastomer in an uncured matrix of resinous thermoplastic polymer.

Gessler's U.S. Pat. No. 3,037,954 discloses compositions comprising polypropylene and a rubber such as, for example, butyl rubber, chlorinated butyl rubber, polybutadiene, polychloroprene and polyisobutene. Compositions of about 50 to 95 parts polypropylene and about 5 to 50 parts of rubber are disclosed.

Since these early beginnings in TPO technology, research and development has been directed towards production of TPOs having improved properties or properties desirable in a specialized application. There are several variables which may be manipulated to effect changes in the properties of TPO blends. Some of the readily apparent variables include the relative weight percentages of the elastomer and thermoplastic phases, the degree of cure of the elastomers, the composition of each of these phases, the additives and fillers used, etc.

U.S. Pat. No. 4,593,062 to Puydak et al is directed to TPOs having good flow, good physical strength characteristics, good processability, good oil resistance, low compression set and good surface characteristics in injection molded parts. The preferred embodiment of the TPO comprises equal parts of polyolefin, halobutyl rubber, and polychloroprene rubber. It is preferred that all components be present before dynamic vulcanization is initiated. However, some or all of the oil or fillers may be added after dynamic vulcanization is complete.

U.S. Pat. No. 4,735,982 to Orndorff Jr. is directed to a TPO which has low wet and dry friction and good wear resistant properties. The TPO includes additives such as oils, graphite, and glass fibers which may be added before or after the dry mixing of the thermoplastic component and the cured rubber compounds.

U.S. Pat. No. 4,130,535 to Coran et al discloses a fully cured TPO having superior tensile strength. Coran et al note that the properties of the TPOs may be modified either before or after vulcanization, by adding ingredients which are conventional in the compounding of copolymer rubber and polyolefin resin and blends thereof. In those blends utilizing carbon black as a filler, Coran et al mixes the rubber with carbon black before adding the polypropylene thermoplastic resin. Thus, the filler is present before dynamic vulcanization is initiated.

U.S. Pat. No. 4,311,628 to Abdou-Sabet et al relates to EPDM-based, phenolic cured TPOs which are tough and strong as compared to similar blends using sulfur or peroxide cures. Abdou-Sabet notes that the properties of TPOs may be modified by adding ingredients which are conventional in the compounding of EPDM rubber, polyolefin resin and blends thereof. Particularly recommended are the addition of carbon black, extender oil or both, preferably prior to dynamic curing.

U.S. Pat. No. 4,202,801 to Petersen discloses dynamically partially cured blends of monoolefin rubber, a polyolefin resin and a conjugated diene rubber. At column 5, lines 15 to 20, it states that after processing the blend, an antioxidant is added to the blend and processing is usually continued for one minute or more to incorporate the antioxidant thoroughly in the blend for the purpose of deactivating any residual curing agent and enhance protection against oxidative degradation of the composition.

U.S. Pat. Re. No. 31,518 to Fischer relates to thermoplastic partially cured blends of monoolefin copolymer rubber with a polyolefin resin. At column 6, lines 25 to 30, it discloses adding to the mixture at the end of the dynamic partial curing step a small amount of a free radical scavenging agent such as a stabilizer or antioxidant.

U.S. Pat. No. 4,217,787 to Matsuda relates to a dynamically partially cured composition comprising a peroxide curable olefin rubber, a peroxide decomposing olefin plastic and a peroxide non-curable hydrocarbon rubber and/or a mineral oil softener. At Column 9, lines 15 to 21, it states that to accelerate the decomposition of the peroxide, it is possible to use a tertiary amine or an organic metal carboxylate.

It has now been found that the addition of solid particulate fillers and certain rubber or plastic compounding additives to the thermoplastic composition after the dynamic vulcanization of the thermoplastic composition improves the stiffness to impact resistance balance of the thermoplastic composition.

SUMMARY OF THE INVENTION

In accordance with the invention, there is provided a dynamically vulcanized composition comprising:
(a) a cured elastomer selected from the group consisting of butyl rubber, halogenated butyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylene-propylene copolymer rubber, ethylene-propylene-diene rubber, polyisoprene, polychloroprene, styrene-butadiene rubber, nitrile rubber, chlorosulfonated polyethylene, and mixtures thereof;

(b) a thermoplastic polyolefin resin; and (c) a solid particulate component selected from the group consisting of a filler, an additive, and mixtures thereof, said additive being selected from the group consisting of ultraviolet light stabilizers, pigments, antiblocking agents, coupling agents for fillers and mixtures thereof, at least a major portion of said solid particulate component being present in said thermoplastic polyolefin resin.

In accordance with the invention, there is also provided a process for producing a dynamically vulcanized composition which comprises the steps of:

(a) dynamically vulcanizing a thermoplastic polyolefin resin and an elastomer selected from the group consisting of butyl rubber, halogenated butyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylene-propylene copolymer rubber, ethylene-propylene-diene rubber, polyisoprene, styrene-butadiene rubber, nitrile rubber, chlorosulfonated polyethylene, and mixtures thereof, in the presence of a curing agent for said elastomer, at dynamic vulcanization conditions to produce a dynamically vulcanized mixture;

(b) adding a solid particulate component selected from the group consisting of a filler, an additive and mixtures thereof, said additive being selected from the group consisting of ultraviolet light stabilizers, pigments, antiblocking agents, coupling agents for fillers, and mixtures thereof, to said dynamically vulcanized mixture resulting from step (a), said dynamic vulcanization step (a) having been conducted at conditions to cure said elastomer sufficiently to produce a dynamically vulcanized composition comprising the major portion of said solid particulate component in said thermoplastic polyolefin resin.

DETAILED DESCRIPTION OF THE INVENTION

This invention relates to dynamically vulcanized thermoplastic alloy compositions, herein also referred to as DVA, which generally comprise a thermoplastic phase and an elastomeric phase. Additives and fillers are usually added to the blend of thermoplastic resin and elastomers before the dynamic vulcanization of the elastomers in the presence of the thermoplastic resin. This results in the inclusion of the additives and fillers in the cured elastomeric phase, and, indeed, a proportionately higher distribution of filler or additive is present in the elastomeric phase as opposed to the thermoplastic phase. It has now been found that the substantial exclusion of fillers and/or additives from the elastomeric phase results in improvements in DVA product properties.

The general process for producing dynamically vulcanized thermoplastic compositions is well known in the art. The resin, at least one elastomer, fillers, additives, etc., and curing agent are subjected to dynamic vulcanization or the resin, elastomer, filler and additives are premixed, and subsequently subjected to dynamic vulcanization in the presence of a curing agent. The latter process generally includes the steps of: preparing an initial mix of resin, at least one elastomer, fillers, stabilizers, plasticizers, etc.; bringing the initial mix to flux and mixing to the desired level of dispersion; adding curatives for the elastomer; increasing the temperature of the mix to the range necessary for dynamic vulcanization to occur; completing the dynamic vulcanization while continuing to mix at high shear rates; and finally removing the blend from the vulcanization zone maintained at vulcanization temperature, cooling and then pelletizing the DVA product. In the conventional process, the fillers and additives are generally added prior to the addition of curing agents for vulcanization of the elastomer, that is, prior to the dynamic vulcanization step. This results in a dynamically vulcanized thermoplastic composition comprising the fillers and additives distributed predominantly in the elastomeric phase.

The process for the production of the improved dynamically vulcanized thermoplastic compositions of the present invention follows the above described processes except that the addition of fillers and the specified suitable additives is performed after the thermoplastic composition has been subjected to dynamic vulcanization for a time sufficient to cure (crosslink) the elastomeric component of the composition sufficiently to prevent penetration of the major portion of the fillers and/or additives into the elastomeric phase, preferably, for a time sufficient to produce an elastomer substantially free of filler and of said specific additives. The polyolefin resin phase, consequently, comprises distributed through it at least a major portion of the fillers and said additives, preferably substantially all of the fillers and said additives. By the term "an elastomer substantially free of fillers and additives" is intended herein that less than about 20, preferably less than about 10 weight percent of the fillers and specified additives are present in the elastomeric phase. In order to achieve this distribution, the thermoplastic elastomeric composition is subjected to dynamic vulcanization under conditions and for a time sufficient to vulcanize (i.e., cure) the elastomer present in the composition at least partially but sufficiently to prevent the penetration of the major portion of fillers and of said additives into the elastomer. Preferably, the filler and said additives are added to the dynamically vulcanized composition after the elastomer comprised in the composition is fully cured. In the embodiment in which the addition of filler and additives is made to a elastomeric thermoplastic composition comprising the partially cured elastomers, the dynamic vulcanization is continued to produce as a final product a thermoplastic composition comprising a fully cured elastomer distributed in a polyolefin resin matrix which also comprises distributed therein solid particulate fillers and/or certain additives. It should be noted that other additives such as process oils etc., may be added to the thermoplastic composition prior to the dynamic vulcanization. Alternatively, the filler and/or the specified additives may be compounded with the dynamically vulcanized composition at a later stage to produce the final finished product.

As used herein, the term "dynamic vulcanization" means a vulcanization process for a rubber-containing TPO composition wherein the rubber is vulcanized under conditions of high shear in the presence of the polyolefin resin, as a result of which, the rubber is simultaneously cross-linked and dispersed as fine particles of a "micro-gel" within the thermoplastic resin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin-screw extruders. The unique characteristic of dynamically cured compositions is that, notwithstanding the fact that the rubber component may be fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) is used herein to denote a composition comprising at least one thermoplastic resin and at least one rubber wherein at least one rubber has been dynamically vulcanized to at least a partially cured state. The DVA compositions are prepared by blending together the thermoplastic resin and rubber with curatives and fillers under conditions of dynamic vulcanization.

The term "thermoplastic resin" means any polyolefin resin composition which exhibits thermoplastic properties. The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), linear low density polyethylene (LLDPE) and polybutylene (PB), as well as copolymers of ethylene with vinylacetate, acrylic acid, methyl acrylate, ethyl acrylate, etc. However, these other polyolefin resins can be incorporated into the DVA compositions of this invention along with the polypropylene ("PP") or high density polyethylene ("HDPE"). As used herein the term "polypropylene" includes homopolymers of propylene as well as reactor copolymers of polypropylene (PPRC) which can contain about 1 to about 20 wt% ethylene or an alpha olefin comonomer of 4 to 16 carbon atoms. The polypropylene can be highly crystalline isotactic or syndiotactic polypropylene. The PPRC can be either a random or block copolymer. The density of the PP or PPRC can be from about 0.88 to about 0.92 g/cc; generally, from about 0.89 to about 0.91 g/cc.

High density polyethylene (HDPE), useful as the polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Polyolefin resins which can, optionally, be included in the compositions of this invention include polybutylene, LDPE and LLDPE as well as copolymers of ethylene with unsaturated esters of lower carboxylic acids.

The term "low density polyethylene" or "LDPE" as used herein means both low and medium density polyethylene having densities of about 0.910 to about 0.940 g/cc. The terms include linear polyethylene as well as copolymers of ethylene which are thermoplastic resins.

Linear low density polyethylene (LLDPE) is a class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The term "polybutylene" is used herein to denote thermoplastic resins of both poly(1-butene) homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene-butene-1 copolymers are available with melt indices that range from about 0.3 to about 20 g/10 min.

The curable, or vulcanizable, rubbers which can be used in the practice of this invention include both synthetic and natural rubbers; at least one of the rubbers utilized must be vulcanizable. Illustrative, non-limiting examples of rubbers suitable for use in the practice of this invention include butyl rubber, halogenated butyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylenepropylene copolymer rubber (EPM), ethylene-propylene-diene rubber (EPDM), polyisoprene, polychloroprene, styrene-butadiene rubber, nitrile rubbers, chlorosulfonated polyethylene, etc. While polyisobutylene (PIB) is not a true rubber because it cannot be vulcanized, it can be utilized in the practice of this invention in conjunction with a vulcanizable rubber provided that the PIB has a viscosity average molecular weight of about 40,000 to about one million.

The term "rubber" as used herein means any natural or synthetic polymer which can be vulcanized or cured so as to exhibit elastomeric properties. The term "elastomer" is used interchangeably with the term rubber.

The terms "EPM" and "EPDM" are used in the sense of their ASTM designations. EPM is an ethylene-propylene copolymer rubber which can be cross-linked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tetrahydroindene; methyltetrahydroindene; dicyclopentadiene; 5-isopropylidene-2-norbornene; 5-vinylnorbornene; etc.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20–50 wt% acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book*. 1980 Edition, Materials and Compounding Ingredients for Rubber, pages 386–406.

Suitable copolymers of a $C_4$ to $C_7$ isomonoolefin and a para-alkylstyrene include copolymers which have a substantially homogeneous compositional distribution such as those described in European patent application 89305395.9 filed May 26, 1989 (Publication No. 0344021 published November 29, 1989). The preferred isomonoolefin comprises isobutylene. The preferred para-alkylstyrene comprises para-methylstyrene. The copolymers can be halogenated to produce a halogen-containing copolymer of a $C_4$ to $C_7$ isomonoolefin and a para-alkylstyrene suitable for use as elastomeric component of the composition of the present invention by methods similar to those used to halogenate butyl rubber. The bromo-isobutylene para-methylstyrene is the preferred halogen-containing copolymer of a $C_4$ to $C_7$ isomonoolefin and a para-alkylstyrene.

Butyl rubber is a copolymer of an isoolefin and a conjugated multiolefin. The useful rubber copolymers comprise a major portion of isoolefin and a minor amount, preferably not more than 30 wt%, of a conjugated multiolefin. The preferred rubber copolymers comprise about 85-99.5 wt% (preferably 95-99.5 wt%) of a $C_4$ to $C_7$ isoolefin, such as isobutylene, and about 15-0.5 wt% (preferably 5-0.5 wt%) of a multiolefin of about 4 to 14 carbon atoms. These copolymers are referred to in the literature as "butyl rubber"; see for example, the textbook *Synthetic Rubber* by G. S. Whitby (1954 edition by John Wiley and Sons, Inc.), pages 838-891, etc. The term "butyl rubber" as used herein includes the aforementioned copolymers of an isoolefin having 4 to 7 carbon atoms and about 0.5 to 20 wt% of a conjugated multiolefin of about 4 to 14 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

Butyl rubber as above described may be halogenated with from about 0.1 to about 10, preferably, about 0.5 to about 3.0 wt% chlorine or bromine to make a suitable halobutyl rubber. The chlorinated form of butyl rubber is commonly known as "chlorobutyl rubber" and the brominated form as "bromobutyl rubber."

The solid particulate component, which is added to the thermoplastic elastomeric composition of the present invention, after it has been subjected to dynamic vulcanization under conditions to cure the elastomer comprised in the composition sufficiently to prevent penetration of at least a major portion of the solid particulate component into the elastomer may be a filler, certain additives which are conventional rubber compounding additives, plastic compounding additives and mixtures thereof. Suitable additives are selected from the group consisting of pigments, ultraviolet light stabilizers, anti-blocking agents, coupling agents for fillers and mixtures thereof. The fillers may be organic fillers and inorganic fillers (e.g., mineral fillers). Preferably, the filler is an inorganic filler. Suitable fillers include talc, glass fiber, polyaramide fibers, poly-fluro-hydrocarbon fibers, silica, clays, solid flame retardants, calcium carbonate, titanium dioxide, barium sulfate, carbon black, other mineral fillers, and mixtures thereof. The carbon black can be derived from any source and be any type of carbon black. Any effective amount of filler may be added. Typically, the filler is added in an amount ranging from about 5 to about 70 weight percent based on the total thermoplastic dynamically vulcanized composition. For specific fillers, these proportions may vary. Carbon black is preferably added in an amount ranging from about 5 to about 40 weight percent. Glass fiber is generally added in an amount ranging from about 1 to 50 weight percent, preferably from about 20 to about 40 weight percent.

Suitable ultraviolet light stabilizers are solid (at standard temperature and pressure) particulate materials having a molecular weight of at least about 1,000, preferably, at least about 5,000.

The term "filler" as used herein refers to non-reinforcing fillers, reinforcing fillers, organic fillers and inorganic fillers. It will be understood that for a particular application, the effective amount of filler or additive may well be outside of these ranges. Since the invention concentrates the filler in the thermoplastic phase where it is most needed in the case of reinforcing fillers, a reduction in the quantity of filler to be added may be expected for maintaining the same strength desired.

The suitable additives for the practice of the invention may be added in an amount ranging from about 0.05 to about 5 weight percent, preferably from about 0.05 to about 3 weight percent, based on the total composition. When the suitable additive is an ultraviolet light stabilizer, the ultraviolet light stabilizer may be present in an amount ranging from about 0.05 to about 1.0 weight percent, based on the total composition.

The term "ultra-violet light stabilizer" (U.V. stabilizer) is used herein to denote compounds which provide stabilization or protection from the degrading effects of ultra-violet light on DVA compositions. The U.V. stabilizers do not adversely affect the DVA compositions of the present invention. It has been found that addition of U.V. stabilizers to TPO compositions can significantly decrease the crosslinking performance of curatives utilized for halobutyl elastomer materials. Such decrease does not occur to the same extent when the curative system is a maleimide curative system. Suitable U.V. stabilizers include hindered amine light stabilizers (HALS) which belong to a class of compounds referred to as "hindered amines." These hindered amines have been found to be effective in stabilizing polymers. See, for example, U.S. Pat. No. 4,064,102 the teachings of which are hereby incorporated by reference. Commercially available HALS include those sold under the tradenames Tinuvin 770 and Chimassorb 994 LD, which are believed to be bis(2,2,6,6-tetramethyl-4-piperidyl) sebacate and poly((6-((1,1,3,3-tetramethylbutyl)amino)-s-triazine-2,4-diyl)((2,2,6,6-tetramethyl-4-piperidyl) imino) hexamethylene, respectively. The effective amount of U.V. stabilizer added will depend upon the particular stabilizer used and the degree of protection desired.

When U.V. stabilizers are used in the process of this invention, it is preferred that the blends be dynamically vulcanized in the presence of a maleimide cure system although other cure systems discussed below are also useful. The maleimide compound preferably used in the invention is a bismaleimide compound. Among the maleimide compounds, a bismaleimide compound is especially superior in effectiveness and m-phenylene bismaleimide (4,4'-m- phenylene bismaleimide) is preferred. Examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4, 4'-biphenyl bismaleimide, o-phenylene bismaleimide, m- phenylene bismaleimide (HVA-2), hexamethylene bismaleimide and 3,6-durine bismaleimides.

The maleimide curative systems include an effective amount of a maleimide curing agent. By "effective amount" is meant that the amount is sufficient to effect a cured state of at least a portion of the elastomer. Such effective amounts may range from about 0.5 to about 4 phr (parts per hundred parts of rubber). A halobutyl-containing DVA prepared with an effective amount of a maleimide curative has been found to have long term heat aging characteristics and, unexpectedly, retains the beneficial properties in the presence of U.V. stabilizers. Hindered amine light stabilizers include metal salts which appear to be detrimental to chloro- and bromobutyl materials.

Any particular curative system known in the art for the vulcanization of rubbers is suitable. These include peroxide cures and sulfur cures as well as non-sulfur cures depending upon the specific blend components. For example, halogenated butyl rubber can be cured using zinc oxide. Furthermore, accelerators such as dithiocarbamates or thiurams and thioureas can be included in these zinc oxide cures. Zinc oxide free cures of halogenated butyl rubber known to the art can also be utilized. For example, such vulcanizing systems comprise litharge, 2-mercaptoimidazoline and diphenyl guanidine.

Resin cures can be used for both butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

Organic peroxides may be used in the cure systems of the invention DVA. Specific examples of the useful organic peroxides are octanoyl peroxide, lauroyl peroxide, benzoyl peroxide, tert-butyl peroctoate, p-chlorobenzoyl peroxide, 2,4-dichlorobenzoyl peroxide, cyclohexanone peroxide, tert-butyl peroxybenzoate, methyl ethyl ketone peroxide, dicumyl peroxide, di-tert-butyl peroxide, 2,5-dimethyl-2,5-di(benzoylperoxy)hexane 2,5-dimethyl-2,5-di(tert-butylperoxy)hexane, di-tert-butyl diperoxyphthalate, tert-butylcumyl peroxide, diisopropylbenzene hydroperoxide, 1,3-bis(tert-butylperoxyisopropyl)benzene, tert-butyl peroxypivalate, 3,5,5-trimethylhexanoyl peroxide, 1,1-bis(tert-butylperoxy)-3,5,5-trimethylcyclohexane, 1,1-bis(tert-butylperoxy) cyclohexane, etc.; azo compounds such as azobisisobutyronitrile, etc.; and the like. The peroxide compositions may be used with or without co-agents such as sulfur, ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, m-phenylene bismaleimide (HVA-2), and the like.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thiuram tetrasulfide; ethylene trithiocarbonate; 2-mercaptobenzothiazole; benzothiazole disulfide; N-phenyl -beta-naphthylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises MgO, ZnO, m-phenylene bismaleimide and zinc diethyldithiocarbamate since this system results in a vulcanized rubber with low compression set.

In the practice of this invention, a thermoplastic resin is mixed with a rubber at a temperature sufficient to soften the resin or, more commonly, at a temperature above its melting point where the resin is crystalline at room temperature. After the resin and rubbers are intimately mixed, the curative is added. Heating and masticating with shearing at vulcanization temperatures are generally adequate to complete vulcanization in about 0.5 to about 10 minutes. The vulcanization time can be reduced by elevating the temperature of vulcanization. A suitable range of vulcanization temperatures is from about the peak melting point of the resin (about 130° C. for HDPE and about 165° C. for PP) to about 250° C.; more typically, the temperature range is about 150° C. to about 225° C. Preferably the vulcanization is carried out at a temperature of about 60° C. to about 200° C.

It is preferred that the mixing process be continued until the degree of vulcanization desired is achieved. If vulcanization is permitted to continue after mixing has stopped, the composition may not be reprocessable as a thermoplastic.

Once vulcanization is achieved, the fillers and/or additives are added and mixed into the blend. This ensures that in the fully vulcanized DVA the fillers and/or additives will be retained in the thermoplastic phase because they will not be able to penetrate into the cross-linked elastomer phase. However, depending upon the degree to which it is desirable to have some of the filler and/or additive incorporated into the elastomer phase, the fillers and/or additives may be added at the desired level of partial cure of the elastomer phase.

As an alternative to the above process, the DVA product may be produced without fillers or additives. The fillers and/or additives may then be added in a later second compounding operation.

The term "fully vulcanized" relative to the dynamically vulcanized rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of gel content or conversely extractable components. Alternatively, the degree of cure can be expressed in terms of cross-link density.

Where the determination of extractable is an appropriate measure of the state of cure, the improved thermoplastic elastomeric compositions are produced by vulcanizing the curable rubber component of the blends to the extent that the composition contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component, the better are the properties and still more preferable are compositions comprising essentially no extractable rubber from the cured rubber phase (less than 0.5 wt%). Gel content, reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that the large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech.* 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term "v" is multiplied by the gel fraction (% gel/100). The cross-link density is half the effective network chain density "v" determined in the absence of resin. The cross-link density of the vulcanized blends should therefore be understood to refer to the value determined on the same rubber as in the blend in the manner described. Still more preferred compositions meet both of the aforedescribed measures of state of cure, namely, by estimation of cross-link density and percent of rubber extractable.

The thermoplastic composition of the present invention may comprise other additives besides the previously mentioned additives, for example, rubber process oil. These other additives may be added before the dynamic vulcanization step. Thus, when a rubber process oil is to be incorporated in the composition, it is preferred to add it before the dynamic vulcanization step.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil which should be utilized with a particular rubber. The quantity of rubber process oil utilized is based on the total rubber content, both cured and uncured, and can be defined as the ratio, by weight, of process oil to the total rubber in the DVA. This ratio can vary from about above 0 to about 1.5/1; preferably about 0.2/1 to about 1.00/1; more preferably about 0.3/1 to about 0.8/1. Larger amounts of process oil can be used, the deficit being reduced physical strength of the composition. Oils other than petroleum based oils, such as oils derived from coal tar and pine tar, can also be utilized. In addition to the petroleum derived rubber process oils, organic esters and other synthetic plasticizers can be used.

The dynamically vulcanized composition of the present invention may comprise from about 10 to about 90 weight percent, preferably from about 15 to 85 weight percent of said thermoplastic polyolefin resin, from about 90 to 10, preferably from about 85 to 15 weight percent of said elastomer, and from about 0.05 to 50, preferably from about 0.05 to 40 weight percent of said solid particulate component, based on the total dynamically vulcanized composition.

In one embodiment of the invention, a thermoplastic composition comprising an ethylene-propylene elastomer and a polypropylene polyolefin resin and a curing agent is subjected to dynamic vulcanization to cure the elastomer at least partially, preferably fully and subsequently adding fibers such as glass fibers, mineral fibers, polyaramide fibers, polyfluorohydrocarbon fibers, and the like, to the dynamically vulcanized composition after it has been dynamically vulcanized to a level in which the elastomer is sufficiently cured (i.e., cross-linked) to prevent penetration of the major portion of the added fibers into the elastomeric phase, preferably in which the elastomer is fully cured before the addition of the fibers. When the fibers are added to the composition comprising the partially cured elastomer, the dynamic vulcanization is continued after the addition of the fibers to produced a fully cured elastomer in the final product.

The preferred fibers are glass fibers. The glass fibers may be added in an amount ranging from about 1 to 50 weight percent, preferably from about 10 to 40 weight percent, based on the total weight of the composition. The glass fibers may be short, that is, chopped and have a length approximately 1/16" to about 1", although larger or smaller fibers can be utilized. Care is to be utilized not to use excessive amount of glass fiber that can act as abrasive.

Although any known curing agent may be used for the above described embodiment, it is preferred to use a peroxide curing agent since the peroxide will decompose at least a portion of the peroxide decomposable polypropylene polyolefin resin during the dynamic vulcanization and, thereby produce a composition having improved flow properties as well as improved stiffness to flow balance.

In the above embodiment using a peroxide curing agent, the polypropylene resin may be present in the amount ranging from about 10 to 90 weight percent, preferably from about 15 to 85 weight percent, the polypropylene decomposition product may be present in an amount ranging from about 10 to about 90 weight percent, the elastomer may be present in an amount ranging from about 90 to about 10 weight percent, and the fiber preferably glass fiber, may be present in an amount ranging from about 1 to 50 weight percent, preferably from about 10 to 40 weight percent, based on the weight of the total composition.

Preferably, the thermoplastic elastomeric composition comprising the ethylene-propylene elastomer, the polypropylene polyolefin resin, and the fibers also comprises a chemically modified polyolefin, that is, a polyolefin grafted with a carboxylic acid group or an acid anhydride group or mixtures thereof. Useful chemically modified polyolefins include homo and copolymers of ethylene and propylene modified by incorporation of a carboxylic acid and/or a carboxylic acid anhydride group. The carboxylic acid anhydride groups are preferred. Suitable anhydride groups include himic, maleic, fumaric, itaconic and mixtures thereof. The preferred anhydrides are himic anhydride and maleic anhydride. The more preferred anhydride is himic anhydride. Such chemically modified polyolefins and their methods of preparation are well known. A preferred himic anhydride modified polypropylene is commercially available, for example, EXXELOR ® PO 2011 from Exxon Chemical Company. The chemically modified polyolefin, such as, for example, himic anhydride grafted polypropylene (HA-PP) may be present in an amount ranging from about above 0 to 30 weight percent, preferably from about 5 to 30 weight percent. The chemically modified polyolefin is preferably added to the composition after the dynamic vulcanization step.

The dynamically vulcanized thermoplastic elastomeric composition described above is prepared in the same manner as previously described with reference to the addition of filler and/or fiber.

EXAMPLE 1

Comparative compositions and compositions in accordance with the invention as described in Tables I and II were mixed in a 25 lb. Banbury mixer using a 7 to 8.5 minute cycle. First four dynamically vulcanized blends 1, 2, 3 and 4, were prepared from the blend ingredients shown in Table IIA. Dynamic vulcanization was carried out at a temperature of about 190° C. while continuously mixing at a high rate of shear. The cured blends were then compounded with the ingredients shown in Table II under conditions of high shear while maintaining a temperature of about 190° C. The final blend compositions are summarized in Table I. From Table II, it will be seen that in the case of DVAs A and C the talc (filler) was added to the blend before dynamic vulcanization commenced while in the case of DVAs B and D the talc was added after dynamic vulcanization was completed. When dynamic vulcanization was complete, the final blends A, B, C and D were each individually sheeted out on a cool mill and then ground for feed to a 15-ton Boy injection molding machine. Dumbbells were injection molded from each blend and compared in properties. The properties measured for each are reported in Table I. The abbreviations and trademark names used in the Tables of the examples are explained in Table III. The test procedures employed in making the property measurements are identified in Table IV. It is readily apparent from the tensile properties, Gardner impact and flexural modulus properties in Table I that compositions B and D, which were compositions in accordance with the present invention, had superior break elongation, flexural modulus and Gardner impact at both room temperature and −40° C. Yield tensile and elongation are comparable to the conventionally produced samples A and C.

TABLE I

|  | A | B | C | D |
|---|---|---|---|---|
| Exxon HD-6901.69 | 83.6 | 83.6 | — | — |
| Exxon HD-6706-69 | — | — | 83.6 | 83.6 |
| Chlorobutyl 1066 | 10.0 | 10.0 | 10.0 | 10.0 |
| Maglite D MgO | 0.04 | 0.04 | 0.04 | 0.04 |
| Irganox 1010 | 0.07 | 0.07 | 0.07 | 0.07 |
| Mistron Cyprubond Talc | 5.0 | 5.0 | 5.0 | 5.0 |
| Zinc Oxide | 1.0 | 1.0 | 1.0 | 1.0 |
| ZDEDC | 0.3 | 0.3 | 0.3 | 0.3 |
| Melt Index at 190° C., ASTM D-1238 | 5.5 | 5.3 | 4.4 | 4.5 |
| Tensile Properties, ASTM D-638, 60 mm/min. | | | | |
| Yield Tensile, psi | 2966 | 3063 | 2482 | 2571 |
| Yield Elongation, % | 15.8 | 14.8 | 19.6 | 18.2 |
| Break Tensile, psi | — | 1873 | — | 1825 |
| Break Elongation, % | 56.7 | 253.9 | 65.8 | 540 |
| Gardner Impact, ASTM D-3029, in-lb/mil | | | | |
| Room Temperature Mean | 1.42 | 1.62 | 1.34 | 1.62 |
| Standard Deviation | 0.03 | 0.08 | 0.05 | 0.03 |
| −40° C. Mean | 1.16 | 1.84 | 1.04 | 1.65 |
| Standard Deviation | 0.09 | 0.08 | 0.09 | 0.08 |
| Flexural Modulus, 1% Secant, ASTM D-790 kpsi | 98.8 | 105.5 | 77.7 | 85.2 |

TABLE IIA

| Initial Dynamically Vulcanized Master Blends | | | | |
|---|---|---|---|---|
|  | 1 | 2 | 3 | 4 |
| Exxon HD-6901.69 | 25 | 47 | — | — |
| Exxon HD-6706.69 | — | — | 25 | 47 |
| Chlorobutyl 1066 | 46 | 47 | 46 | 47 |
| Maglite D | 0.2 | 0.2 | 0.2 | 0.2 |
| Irganox 1010 | 0.1 | 0.1 | 0.1 | 0.1 |
| Mistron Cyprubond | 23 | — | 23 | — |
| Zinc Oxide | 4.5 | 4.5 | 4.5 | 4.5 |
| ZDEDC | 1.2 | 1.2 | 1.2 | 1.2 |
| Total % | 100 | 100 | 100 | 100 |

TABLE IIB

| Final Dynamically Vulcanized Blends | | | | |
|---|---|---|---|---|
|  | A | B | C | D |
| Exxon HD-6901.69 | 78.2 | 3.6 | — | — |
| Exxon HD-6706.69 | — | — | 78.2 | 73.6 |
| Mistron Cyprubond | — | 5.0 | — | 5.0 |
| Irganox 1010 | 0.1 | 0.1 | 0.1 | 0.1 |
| Master Blend 1 | 21.7 | — | — | — |
| Master Blend 2 | — | 21.3 | — | — |
| Master Blend 3 | — | — | 21.7 | — |
| Master Blend 4 | — | — | — | 21.3 |
| Total % | 100 | 100 | 100 | 100 |

TABLE III

| EXXON HD-6901.69 | HDPE, 8 MI, 0.965 density, Exxon Chemical Co. |
|---|---|
| EXXON HD-6706.69 | HDPE, 6.8 MI, 0.952 density, Exxon Chemical Co. |
| Chlorobutyl 1066 | Chlorinated isoprene-isobutylene copolymer, 51–60 Mooney Viscosity (1 + 8) 100° C., Exxon Chemical |
| Mistron Cyprubond Talc | Chemically treated Mistron Vapor Talc |
| Maglite D | Magnesium oxide, C. P. Hall Co. |
| Irganox 1010 | Hindered Phenolic Antioxidant, Thermal Stabilizer, Ciba-Geigy |
| Protox 169 Zinc Oxide | French process zinc oxide |
| ZDEDC | Zinc diethyl dithiocarbamate |
| PPRC | Polypropylene, random copolymer, 5 wt. percent ethylene content, 5 MFR, Exxon Chemical Company |
| Ethylene Propylene elastomer[1] | VISTALON ® 719, 74 percent ethylene content, 54 ± 4 Mooney Viscosity (1 + 4) 125° C., |

TABLE III-continued

| | |
|---|---|
| | EPM copolymer, Exxon Chemical Company |
| TAC | Triallyl cyanurate, 72 percent active ingredient, American Cyanamide Company |
| VULCUP 40 KE | α-α-bis(t-butyl-peroxy) diisopropylbenzene on Burgess KE clay, Hercules Company |
| Himic anhydride - grafted P | Polypropylene homopolymer grafted with anhydride functionality, 0.25 wt. percent himic anhydride, Exxon Chemical Company |
| Burgess KE clay | Chemically treated anhydrous aluminum silicates (Hercules Company) |

TABLE IV

| | |
|---|---|
| Tensile properties, 60 mm/min | ASTM D-638 |
| Yield tensile, psi | |
| Yield elongation, % | |
| Break tensile, psi | |
| Break elongation, % | |
| Heat Distortion Temperature at at 66 psi, °C. | ASTM D-1637 |
| Gardner Impact, lb/mil | ASTM D-3029 |
| Room temperature, mean | |
| Standard deviation | |
| −40° C., mean | |
| Standard deviation | |
| Flexural Modulus, 1% Secant, kpsi | ASTM D-790 |
| Melt Index, 190° C. | ASTM D-1238, Condition E |
| Melt Flow rate, 230° C. | ASTM D-1238, Condition L |
| Hardness, Shore D | ASTM D-2240 |
| Notched IZOD Impact, ft.-lb/in. | ASTM D-256, Method A |
| Room Temperature, mean | |

EXAMPLE 2

The thermoplastic composition used in the following experiments, hereinafter designated, Master Batch A, comprised a physical mixture of ethylene-propylene elastomer having about 75 wt. percent ethylene and a polypropylene random copolymer having about 5 wt. percent ethylene (Table VA).

An organic peroxide curing agent was added in an amount of about 3.5 wt. percent to Master Batch A and the resulting mixture was subjected to dynamic vulcanization at a temperature of about 160° C. for 5 minutes. Since polypropylene undergoes chain scission on peroxide addition, the resulting vulcanized composition comprised a scissioned product of polypropylene, as well as original polypropylene residues and vulcanized (i.e., crosslinked) ethylene-propylene elastomer. This vulcanized composition is designated, hereinafter, Master Batch B. Formulation 1 in Table VB was a control formulation. Formulations 2 and 3 were formulations in accordance with the present invention in which the glass fiber was added after vulcanization. As can be seen from the data in Table VB, the selective exclusion of the glass fiber from the elastomer enhanced stiffness, heat distortion temperatures while the simultaneous chain scission of polypropylene imparted increased flowability. In formulation 3, in which there was the additional presence of himic anhydride grafted polypropylene (HA-PP), there were additional improvements in impact strength and heat distortion temperatures.

EXAMPLE 3

Table VIA shows unvulcanized Master Batch composition (Master Batch C) and dynamically vulcanized blends containing decreased levels of organic peroxide (Master Batches D and E) to control the chain scission of polypropylene. Table VI B shows compositions in accordance with the present invention containing increased glass fiber content as well as inclusion of both vulcanized and unvulcanized master batches. These blends had higher heat distortion temperatures and higher flexural moduli than the composition of Example 2 while retaining comparable impact strength.

TABLE V

Order of Blending with Glass Fibers (30%)

TABLE VA

| Composition of Master Batches | | |
|---|---|---|
| Master Batch | A | B |
| Ethylene Propylene Elastomer[1] | 23.5 | 23.0 |
| PPRC | 70.4 | 69.1 |
| TAC (72% Active) | — | 0.6 |
| VULCUP 40 KE (40% Active) | — | 3.4 |
| Burgess KE Clay | 6.0 | 3.8 |
| Irganox 1010 | 0.1 | 0.1 |

TABLE VB

Final Vulcanized and Dynamically Vulcanized Blends Containing Glass Fibers (30%)

| Formulation | 1 | 2 | 3 |
|---|---|---|---|
| Master Batch A | 60 | — | — |
| Master Batch B | — | 60 | 60 |
| Fiber Glass (3/16 in.) | 30 | 30 | 25 |
| Himic Anydride-g-PP | — | — | 5 |
| Other Additives[2] | 10 | 10 | 10 |
| Physical Properties | | | |
| Hardness @ 5 sec. delay, Shore D | 45 | 43 | 50 |
| Flexural Modulus, Kpsi | 97 | 151 | 137 |
| Tensile Strength, psi | 1961 | 2508 | 2859 |
| Tear - Die C, lb/in | 226 | 226 | 192 |
| 21C Notched Izod Impact, ft-lb/in | 2.3 | 1.9 | 3.3 |
| Flow | | | |
| Melt Flow Rate | 3 | 115 | 171 |
| Thermal | | | |
| Heat Distortion Temperature @ 66 psi, °C. | 66 | 85 | 92 |

Footnotes:
[1]VISTALON ® 719 - see Table III
[2]Other additives were styrene butadiene thermoplastic elastomer (5%), process oil (5%) and antioxidant Irganox 1010 (0.2%)

TABLE VI

Examples with Higher Glass Fiber Level (40%)

TABLE VIA

| Composition of Master Batches | | | |
|---|---|---|---|
| Master Batch | C | D | E |
| Ethylene Propylene Elastomer | 25 | 25 | 25 |
| PPRC | 75 | 75 | 75 |
| TAC (72% Active) | — | 0.6 | 0.6 |
| VULCUP 40 KE (40% Active) | — | 0.6 | 0.1 |
| Irganox 1010 | 0.1 | 0.1 | 0.1 |

TABLE VIB

| Final Blends Containing Higher Glass Fiber Levels (40%) | | |
|---|---|---|
| Formulation | 4 | 5 |
| Master Batch C | 20 | 20 |
| Master Batch D | 30 | — |
| Master Batch E | — | 30 |
| Fiber Glass (3/16 in. long) | 40 | 40 |
| Himic Anhydride-g-PP | 10 | 10 |
| Physical Properties | | |
| Hardness @ 5 sec. delay, Shore D | 62 | 62 |
| Flexural Modulus, Kpsi | 341 | 360 |
| Tensile Strength, psi | 1256 | 1197 |
| Tear - Die C, lb/in | 268 | 282 |
| 21C Notched Izod Impact, ft-lb/in. | 3.0 | 2.6 |
| Flow | | |
| Melt Flow Rate | 10 | 6 |
| Thermal | | |
| Heat Distortion Temperature @ 66 psi, °C. | 131 | 139 |

What is claimed is:

1. A process for producing a dynamically vulcanized composition, which comprises the steps of:
   (a) dynamically vulcanizing a thermoplastic polyolefin resin and an elastomer selected from the group consisting of butyl rubber, halogenated butyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylenepropylene copolymer rubber, ethylene-propylene-diene rubber, polyisoprene, styrene-butadiene rubber, nitrile rubber, chlorosulfonated polyethylene, and mixtures thereof, in the presence of a curing agent for said elastomer, at dynamic vulcanization conditions to produce a dynamically vulcanized mixture;
   (b) adding a solid particulate filler in an amount ranging from about 5 to about 70 weight percent, based on the weight of the total dynamically vulcanized composition to said dynamically vulcanized mixture resulting from step (a), said dynamic vulcanization step (a) having been conducted at conditions to cure said elastomer sufficiently to produce a dynamically vulcanized composition comprising the major portion of said solid particulate filler in said polyolefin resin.

2. The process of claim 1, wherein the dynamically vulcanized mixture resulting from step (a) comprises an at least partially cured elastomer and wherein said solid particulate filler is added in step (b) to said dynamically vulcanized mixture comprising said at least partially cured elastomer.

3. The process of claim 1, wherein said solid particulate filler is added to a dynamically vulcanized mixture comprising a partially cured elastomer, and wherein after step (b), the resulting mixture is additionally dynamically vulcanized for a time sufficient to produce a dynamically vulcanized composition comprising a substantially fully cured elastomer.

4. The process of claim 1, wherein said dynamically vulcanized mixture resulting from step (a) is subjected to dynamic vulcanization for a time sufficient to produce a dynamically vulcanized composition comprising a cured elastomer substantially free of said solid particulate component.

5. The process of claim 1, wherein prior to said dynamic vulcanization step (a), said thermoplastic polyolefin resin and said elastomer are mixed to produce a blend, and wherein said curing agent is introduced into said blend.

6. The process of claim 1, wherein said filler is a mineral filler.

7. The process of claim 1, wherein said filler is selected from the group consisting of talc, silica, a clay, calcium carbonate, titanium oxide, barium sulfate, carbon black and mixtures thereof.

8. The process of claim 1, wherein said curing agent comprises a maleimide compound.

9. The process of claim 1, wherein said dynamic vulcanization conditions include a temperature ranging from about the melting point of said resin to about 250° C.

10. The process of claim 1, wherein said thermoplastic polyolefin resin has a peak melting point of at least 100° C.

11. The process of claim 1, wherein said thermoplastic polyolefin resin is selected from the group consisting of polypropylene, high density polyethylene, low density polyethylene, linear low density polyethylene, polybutylene, and mixtures thereof.

12. The process of claim 1, wherein said elastomer is selected from the group consisting of butyl rubber, bromobutyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylene-propylene copolymer rubber, ethylene-propylene-diene rubber, and mixtures thereof.

13. The process of claim 1, wherein said composition additionally comprises a chemically modified polyolefin.

14. The process of claim 13, wherein said chemically modified polyolefin is propylene grafted with a moiety selected from the group consisting of carboxylic acids, carboxylic acid anhydrides and mixtures thereof.

15. The process of claim 14, wherein said chemically modified polyolefin is selected from the group consisting of himic anhydride grafted polypropylene, maleic anhydride grafted polypropylene, and mixtures thereof.

* * * * *